US006540454B2

United States Patent
Tanaka et al.

(10) Patent No.: US 6,540,454 B2
(45) Date of Patent: Apr. 1, 2003

(54) SPINDLE HEAD POSITIONAL ERROR CORRECTION METHOD FOR MULTI-AXIS MACHINE TOOL

(75) Inventors: Tadashi Tanaka, Numazu (JP); Kazuo Nagashima, Shizuoka-ken (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 126 days.

(21) Appl. No.: 09/814,696

(22) Filed: Mar. 23, 2001

(65) Prior Publication Data

US 2001/0032056 A1 Oct. 18, 2001

(30) Foreign Application Priority Data

Mar. 23, 2000 (JP) ........................................ 2000-082781

(51) Int. Cl.[7] ................................................. B23C 9/00
(52) U.S. Cl. ........................ 409/131; 409/194; 409/201; 409/211; 409/216
(58) Field of Search ................................. 409/131, 132, 409/201, 211, 216, 193, 194, 231; 700/193

(56) References Cited

U.S. PATENT DOCUMENTS

| 3,823,644 A | * | 7/1974 | Mello ........................ 408/236 |
| 3,823,645 A | * | 7/1974 | Sukhov et al. ............... 409/199 |
| 4,046,057 A | * | 9/1977 | Imamura ..................... 409/199 |
| 4,370,080 A | * | 1/1983 | Goode ......................... 409/200 |
| 5,127,779 A | * | 7/1992 | Yang .......................... 409/201 |
| 5,385,436 A | * | 1/1995 | Corsi .......................... 409/201 |
| 5,538,375 A | * | 7/1996 | Kwapisz ...................... 409/201 |

FOREIGN PATENT DOCUMENTS

| FR | 2428492 A | * | 2/1980 | ................. 409/216 |

* cited by examiner

Primary Examiner—Daniel W. Howell
(74) Attorney, Agent, or Firm—Finnegan, Henderson, Farabow, Garrett, & Dunner, L.L.P.

(57) ABSTRACT

In a multi-axis machine tool (M) including an angular dividing head (HD) having a spindle head (9) mounted thereto, the positional correction includes determining an error representative vector componentwise representative of a plurality of positional errors with respect to a plurality of axes of the spindle head at a respective angular position dividable by the angular dividing head, and correcting an arbitrary positional error of the spindle head by calculating a component vector of the error representative vector associated with the respective angular position.

6 Claims, 4 Drawing Sheets

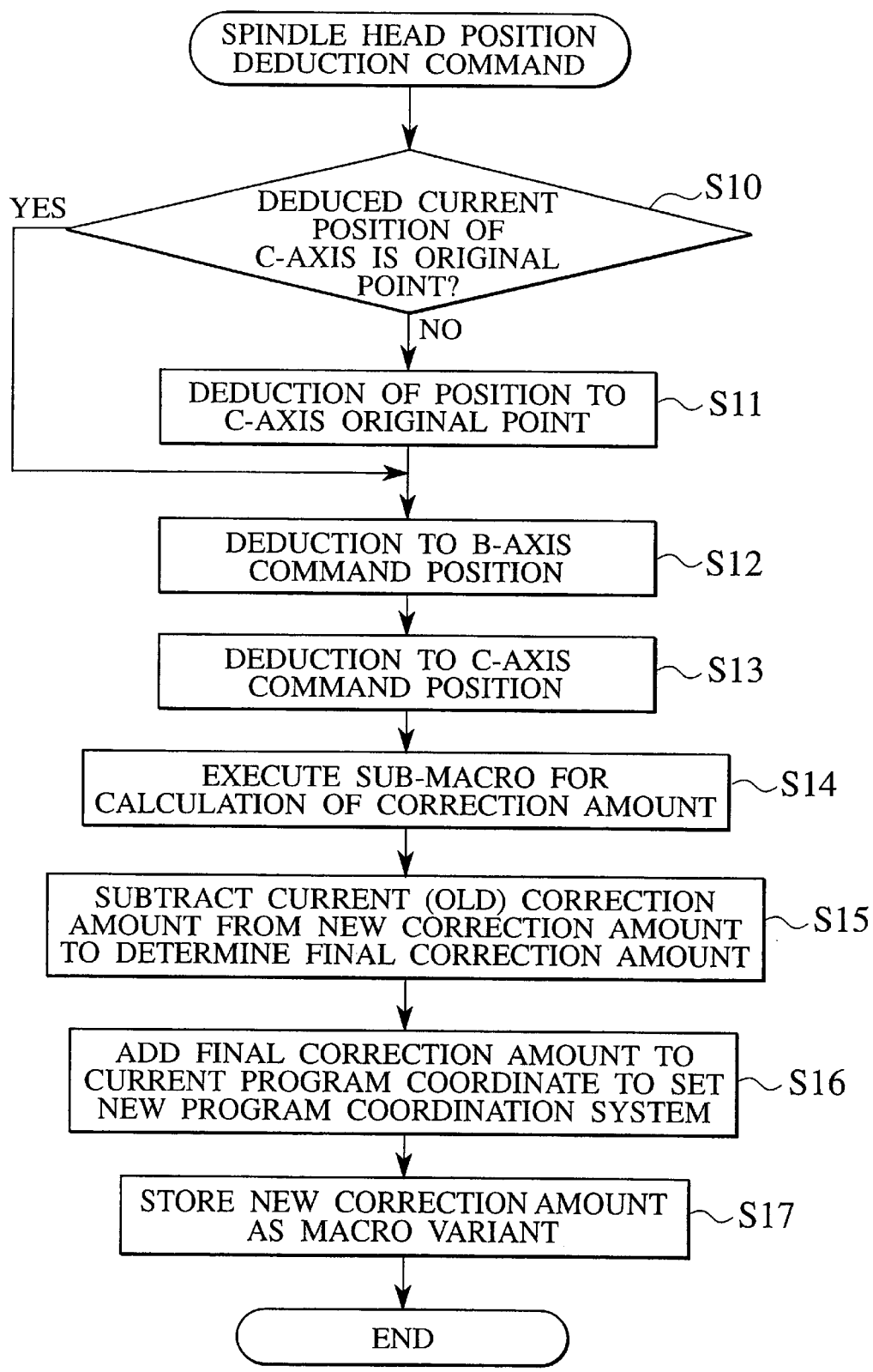

US 6,540,454 B2

SPINDLE HEAD POSITIONAL ERROR CORRECTION METHOD FOR MULTI-AXIS MACHINE TOOL

BACKGROUND OF THE INVENTION

1. Field of the Invention

The present invention relates to a spindle head positional error correction method for multi-axis machine tool, and in particular to a spindle head positional error correction method for a multi-axis machine tool including an angular dividing head.

2. Description of the Related Art

A multi-axis machine tool includes an angular dividing head for machining a free curvature. The dividing head has a spindle head mounted thereto, which needs a correction of its positional error at a respective angular position divided by the dividing head. As used herein, "divide" means "index", and "deduct" means "perform indexing".

Conventionally, all such positional errors have been individually detected in advance, and stored in a memory, to be read by a controller for correction of an associated error in actual machining.

As the number of dividable angular positions increases, there have been needed a greater time for the detection and a greater capacity for the memory.

SUMMARY OF THE INVENTION

The present invention is made with such points in view. It therefore is an object of the present invention to provide a spindle head positional correction method for a multi-axis machine tool including an angular dividing head facilitated in positional correction.

To achieve the object, according to an aspect of the invention, there is provided a spindle head positional error correction method for a multi-axis machine tool including an angular dividing head having a spindle head mounted thereto, the method comprising the steps of determining an error representative vector componentwise representative of a plurality of positional errors with respect to a plurality of axes of the spindle head at a respective angular position dividable by the angular dividing head, and correcting an arbitrary positional error of the spindle head by calculating a component vector of the error representative vector associated with the respective angular position.

According to this aspect of the invention, simply an error representative vector is determined to be based on for correction of an arbitrary positional error. Accordingly, even a short time and a small storage capacity can do for a required positional correction.

BRIEF DESCRIPTION OF THE ACCOMPANYING DRAWINGS

The above and further objects and novel features of the present invention will more fully appear from the following detailed description when the same is read in conjunction with the accompanying drawings, in which.

Figure 1:
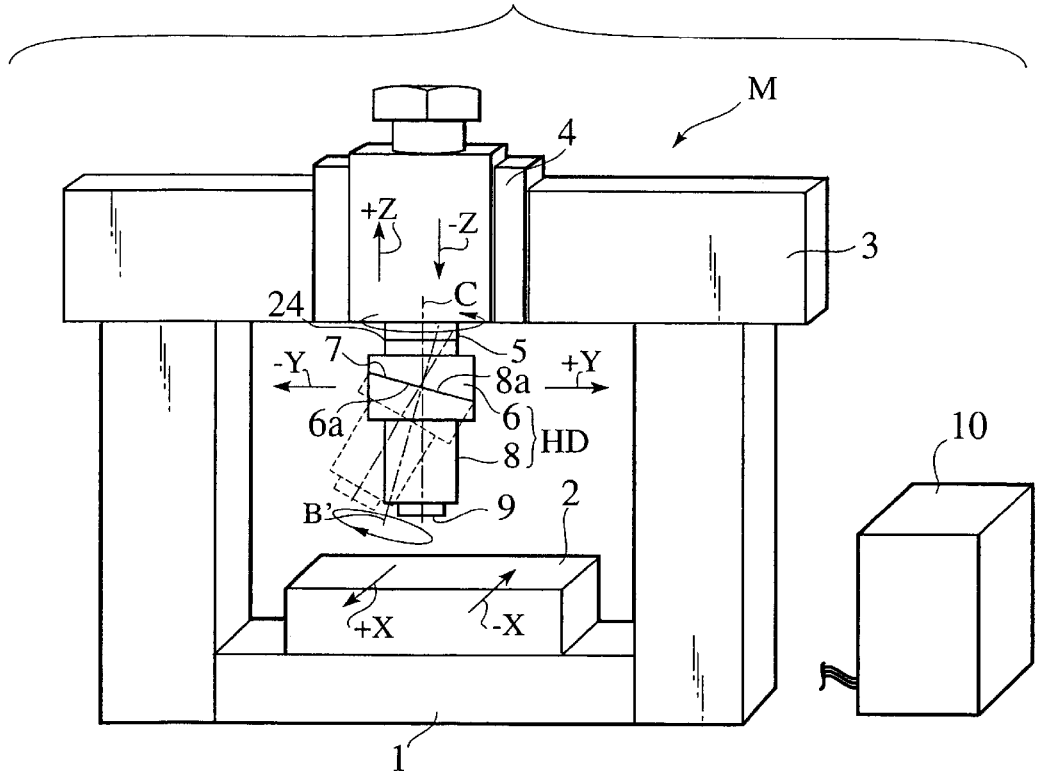
FIG. 1 is a perspective view of a multi-axis machine tool provided with an angular dividing head controllable by five axes including a C-axis and a B'-axis (as a pseudo-B-axis) in accordance with an embodiment of the invention.

FIG. 7 a flowchart of a spindle head positional error correction according to an embodiment of the invention.

DETAILED DESCRIPTION OF THE PREFERRED EMBODIMENTS

There will be detailed below the preferred embodiments of the present invention with reference to the accompanying drawings. Like members are designated by like reference characters.

FIG. 1 shows an essential portion of a multi-axis machine tool M as a gated machining center operable in accordance with an embodiment of the invention. The multi-axis machine tool M is constituted with a bed 1, a work table 2, a cross rail 3, a saddle 4, a ram 5, and an NC (numerical calculation) controller 10 provided with a console (not shown). It is noted that the controller 10 controls respective drive motors of five (X, Y, Z, C, B') axes and hydraulic or pneumatic circuits of the machine tool M. The bed 1 is fixed in position in an imaginary orthogonal coordinate system, which defines any spatial point by a combination of coordinates on an X-axis, a Y-axis, and a Z-axis. The work table 2 is movable on the bed 1 in both (+X, −X) senses of direction of the X-axis, and is fed to an arbitrary X position by an X-axis feeder (not shown) of which a drive motor is controlled from the NC controller 10. The cross rail 3 extends over the work table 2, with legs to stand astride the bed 1. The saddle 4 is supported by the cross rail 3, to be movable in both (+Y, −Y) senses of direction of the Y-axis, and is fed to an arbitrary Y position by a Y-axis feeder (not shown) of which a drive motor is controlled from the NC controller 10. The ram 5 is supported by the saddle 4, to be movable in both (+Z, −Z) senses of direction of the Z-axis, and is fed to an arbitrary Z position by a Z-axis feeder (not shown) of which a drive motor is controlled from the NC controller 10.

Further, as shown in FIG. 1, the multi-axis machine tool M includes an angular dividing head HD rotatably mounted to the ram 5. The angular dividing head HD is constituted with a dividing unit 6 connectable via a horizontal curbic (or toothed curb) coupling 24 to the ram 5, and a spindle unit 8 provided with a spindle head 9 and connectable via an inclined curbic (or toothed curb) coupling 7 to the dividing unit 6. It is noted that a tool (not shown) chucked by the spindle head 9 has its angular position set for a machining, when the head HD is set at a divided stereoscopic angle in a spheroidal range, for example, as illustrated by broken lines in FIG. 1. The dividing unit 6 serves as a C-axis element to be rotatable 360 degrees about a C-axis that is a plumb centerline as an axis of rotation of the unit 6.

Figure 5:
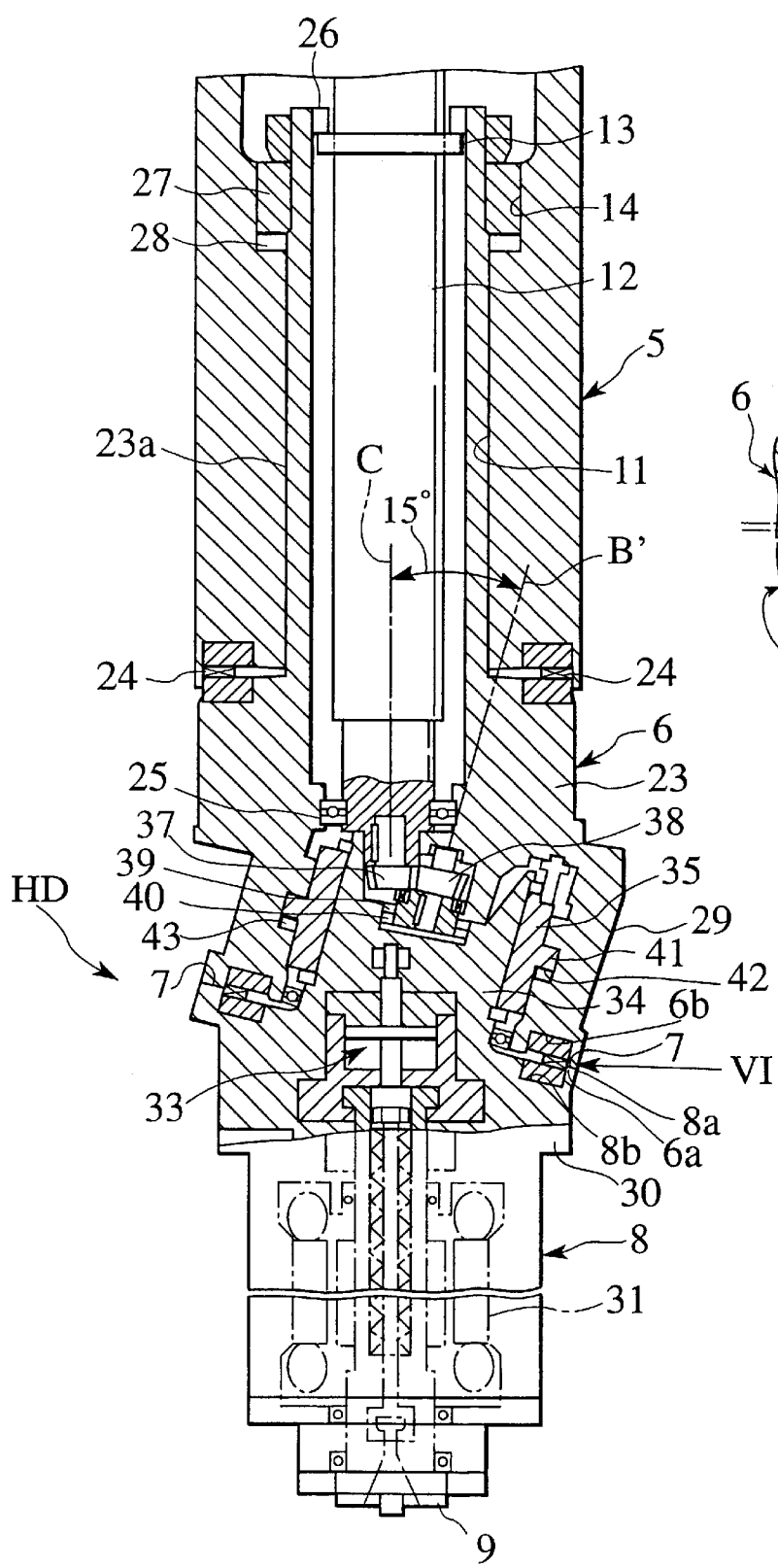
FIG. 5 is a longitudinal section of the angular dividing head.
Figure 6:
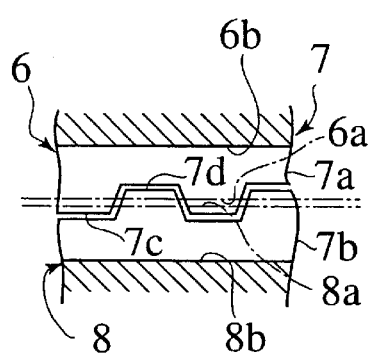
FIG. 6 is a fragmentary view along arrow VI of FIG. 5.

As shown in FIG. 1, FIG. 5, and FIG. 6, this unit 6 has at its bottom an inclined swiveling face 6a (as an inclination-representative plane of its bottom surfaces different in axial position), which is inclined at 15 degrees relative to the C-axis and has a downward toothed curb 7a (FIG. 6) formed on a circular bottom surface 6b (FIG. 6). The representative plane as the swiveling face 6a contains a tooth-pitch circle of the curb 7a. Likewise, the spindle unit 8 has at its top an inclined swiveling face 8a (as an inclination-representative plane of its top surfaces different in level), which also is inclined at 15 degrees relative to the C-axis and has an upward toothed curb 7b (FIG. 6) formed on an opposing circular top surface 8b (FIG. 6). The representative plane as the swiveling face 8a contains a tooth-pitch circle of the curb 7b. As the dividing unit 6 and the spindle unit 8 are hydraulically pressed together, the downward toothed curb 7a on the bottom surface 6b of the dividing unit 6 and the upward toothed curb 7b on the top surface 8b of the spindle unit 8 cooperate with each other to constitute the inclined curbic coupling 7, whereby the swiveling face 6a at the bottom of the unit 6 and the swiveling face 8a at the top of the unit 8 coincide with each other. The spindle unit 8 serves as a pseudo-B-axis element to be rotatable 360 degrees about an inclined B'-axis that is normal or perpendicular to the inclined swiveling face 8a of the unit 8. It is noted that an ordinary B-axis extends in a Y direction, but the B'-axis is inclined.

More specifically, as shown in FIG. 5, the dividing unit 6 has a rotational dividing member 23 stepped at its upper end to be formed with an upwardly extending tubular part 23a. This tubular part 23a is fitted in a cylinder part 11 of the ram 5, to be axially slidable and rotatable about the C-axis. The stepped upper end of the rotational member 23 is engageable, for connection via the horizontal curbic coupling 24, with a lower end of the ram cylinder part 11. Like the above-noted coupling 7, the curbic coupling 24 also is constituted with a downward toothed curb, which is provided on the lower end of the ram cylinder part 11, and an upward toothed curb, which is provided on the stepped upper end of the dividing member 23. The toothed curbs are hydraulically controlled to mesh with each other, so that the dividing member 23 can be set relative to the ram 5, at an arbitrary one of angular positions dividable about the C-axis by engagement between teeth of the curbs. The curbs can be disengaged from each other by hydraulically lowering the dividing member 23 along the C-axis relative to the ram 5.

The rotational dividing member 23 can be driven for rotation by a C-axis motor (not shown) of which the angular position is controlled from the NC controller 10. A drive shaft 12 is loose fitted in the tubular part 23a of the dividing member 23, and rotatably supported near its lower end by a bearing 25 fixed to the dividing member 23. The drive shaft 12 has, near a top end of the tubular part 23a, a radially outwardly projected engagement part 13 formed with upward teeth. The top end of the tubular part 23a has a radially inwardly projected engagement part 26 formed with downward teeth. The engagement parts 13 and 26 are mutually engageable and disengageable, as the dividing member 23 is axially movable relative to the ram 5. When the dividing member 23 is forced down to disengage the curbic coupling 24, the engagement parts 13 and 26 are mutually engaged so that the member 23 is connected for integral rotation with the drive shaft 12.

For axial movement of the dividing unit 6, the tubular part 23a of the rotational dividing member 23 has an annular piston member 27 fixed thereon near the top end. The piston member 27 is fitted in a cylinder bore 14 of the ram 5, to define therebelow an annular upper hydraulic chamber 28. When hydraulic oil is supplied to the hydraulic chamber 28, the dividing member 23 is wholly forced upward, so that the horizontal curbic coupling 24 is connected and concurrently the engagement parts 13 and 26 are disengaged from each other. To the contrary, when hydraulic oil is discharged from the chamber 28, the dividing member 23 is wholly forced downward, so that the curbic coupling 24 is disconnected and concurrently the engagement parts 13 and 26 are engaged with each other.

The rotational dividing member 23 is integrally formed with an inclined tubular part 29 of which the centerline coincides with the B'-axis that is inclined at 15 degrees to the C-axis.

The spindle unit 8 is constituted with a substantially cylindrical housing or unit body member 30, and has incorporated in the body member 30 a built-in drive motor 31 controlled from the NC controller 10, the spindle head 9 to be driven by the motor 31, and a hydraulic or pneumatic cylinder 33 controlled from the controller 10 for operating the spindle head 9 to chuck or release a tool.

The body member 30 has an inclined shoulder part stepped to be formed with an inclined upper shaft part 34 of which the centerline is inclined at 15 degrees relative to that of the spindle head 9. The shaft part 34 has a sleeve member 35 coaxially fixed thereon. The inclined shaft part 34 is axially inserted, together with the sleeve member 35 thereon, into a cylindrical bore of the inclined tubular part 29, so that the shaft part 34 is slidable along and rotatable about the centerline of the tubular part 29 that is then coincident with the B'-axis.

As described, the downward toothed curb 7a of the inclined curbic coupling 7 is provided on an inclined circular surface (as the bottom surface 6b) at a lower end of the inclined tubular part 29 of the rotational dividing member 23, and the upward toothed curb 7b of the curbic coupling 7 is provided on an inclined circular surface (as the top surface 8b) of the shoulder part of the unit body member 30. The toothed curbs 7a and 7b are hydraulically controlled to mesh with each other, so that the body member 30 can be set relative to the dividing member 23, at an arbitrary one of angular positions dividable about the B'-axis by engagement between teeth 7c of the curb 7a and teeth 7d of the curb 7b. The teeth 7c and 7d can be disengaged from each other by hydraulically lowering the body member 30 along the B'-axis relative to the dividing member 23, to thereby release the body member 30.

The drive shaft 12 has at its lower end a driving bevel gear 37 fixed thereto, with its axis of rotation on the C-axis. The rotational dividing member 6 has a yoke projecting in a bore of the inclined tubular part 29, which yoke has in its recessed part a driven bevel gear 38 rotatably mounted thereto via bearings, with an axis of gear rotation aligned to the B'-axis. The driven bevel gear 38 has a shaft part integrally provided with a downward toothed circular engagement part 39. The inclined shaft part 34 of the unit body member 30 has a recessed top part formed with a central bore, which has an upward toothed circular engagement part 40 formed on its wall. The sleeve member 35 on the inclined shaft part 34 has at its axially middle location a circular piston part 41 formed thereon, which piston part 41 is rotatably and slidably fitted in a cylindrical bore 42 of the inclined tubular part 29 of the dividing member 6, to thereby define therebelow an annular lower hydraulic chamber 43. When hydraulic oil is supplied to the hydraulic chamber 43, the spindle unit 8 is wholly forced upward relative to the dividing member 23, so that the inclined curbic coupling 7 is connected and concurrently the engagement parts 39 and 40 are disengaged from each other. To the contrary, when hydraulic oil is discharged from the chamber 43, the spindle unit 8 is wholly forced downward, so that the curbic coupling 7 is disconnected and concurrently the engagement parts 39 and 40 are engaged with each other.

Therefore, by controlling oil supply to the upper and lower hydraulic chambers 28 and 43 and rotation of the drive shaft 12, the spindle head 9 can be set to an arbitrary angular position within a multiplicity of dividable angular positions, which is equivalent to a tooth number of the horizontal curbic coupling 24 times a tooth number of the inclined curbic coupling 7. As the angular position is variable, the spindle head 9 describes a spheroidal envelope within an angle of 60 degrees.

There will be described below how the NC controller 10 recognizes a position of a tool T fixed to the spindle head 9.

A given NC command for an ordinary 5-axis machine tool includes an angular command $\beta$ about a B-axis and an angular command $\gamma$ about a C-axis. Here, as this NC command is used to control the machine tool M of FIG. 1, the given angular command $\beta$ is converted into an angular command $\theta$ about the B'-axis of the machine tool M. Further, the given angular command $\gamma$ is converted into an angular command $\phi$ about the C-axis of the machine tool M. This command $\phi$ is expressed such that $\phi=\gamma+\delta$, where $\delta$ is an angle to be added to the given command $\gamma$, as necessary for a resultant direction of (spindle rotation about) the B'-axis to be coincident with a direction specified by the given commands for the B-axis and the C-axis.

Figure 2:
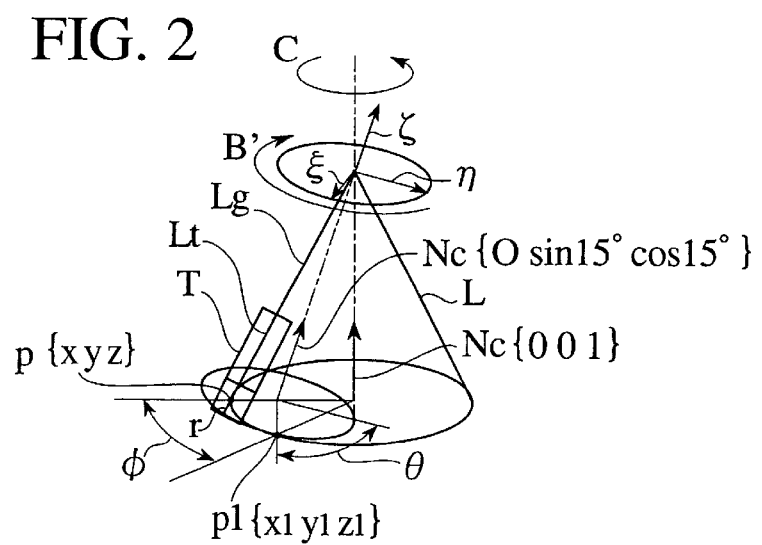
FIG. 2 is a diagram describing a theoretically ideal tool position in a local coordinate system associated with the angular dividing head.

As shown in FIG. 2, there is assumed a local orthogonal coordinate system $\{\xi, \eta, \zeta\}$ that has: an origin on an intersect between the B'-axis and the C-axis; a pair of coordinates $\xi$ and $\eta$ in perpendicular directions to the B'-axis; and a coordinate $\zeta$ in an identical direction to the B'-axis. A memory (not shown) in the controller 10 has stored therein a distance Lg between the origin as a swiveling center and a "gauge line of the tool T in use" (i.e. a reference line defined by a gauge tool), a tool length Lt as a distance between the gauge line and an end of a substantially round tip of the tool T, and a geometric radius r of the round tip of the tool T. A controlled distance L between the swiveling center and a center of the round tip of the tool T is calculated such that L=Lg+Lt−r. A combination $\{\xi, \eta, \zeta\}$ of coordinates $\xi, \eta, \zeta$ of the center of the tool tip is calculated by an expression (1), such that:

$$\{\xi, \eta, \zeta\}=L\{\sin\theta \sin 15°, \cos\theta \cos 15°, -\cos 15°\} \quad (1).$$

This position is first swiveled −15 degrees about the B'-axis, and then at an arbitrary angle $\phi$ about the C-axis, so that the center of the tool tip has a defined position $\{x, y, z\}$ in a wider or absolute coordinate system of the machine tool M, by expressions (2) to (4), such that:

$$x=L\lfloor\cos\phi \sin\phi \sin 15°-\sin\phi(1-\cos\phi)\sin 15° \cos 15°\rfloor \quad (2),$$

$$y=-L\lfloor\sin\phi \sin\theta \sin 15°+\cos\phi(1-\cos\theta)\sin 15° \cos 15°\rfloor \quad (3),$$

and $$z=-L\lfloor 1-(1-\cos\theta)\sin^2 15°\rfloor \quad (4).$$

Here, if $\gamma=0$, then $\theta=\delta$. Therefore, by assuming x=0, necessary angles $\delta$ and $\beta$ for the spindle head 9 to be inclined in the −Y direction can be determined by expressions (5) and (6), such that:

$$\delta=\tan^{-1}\lfloor\sin\theta/(1-\cos\theta)\cos 15°\rfloor \quad (5),$$

and $$\beta=\tan^{-1}\lfloor\sin\theta \sin 15°/\sin\delta\{1-(1-\cos\theta)\cos^2 15°\}\rfloor \quad (6).$$

Incidentally, assuming the curbic coupling 7 for the B'-axis and the curbic coupling 23 for the C-axis to be both 72 in number of teeth, the given command $\beta$ for the B-axis is changed at intervals of 5 degrees, which however are rounded so as to fall within vicinities of theoretically calculated values as shown in the Tables below. Values of angles $\theta$ and $\delta$ are likewise processed. Also such differences are errors, and to be corrected together with errors due to manufacture and deformation of structural members of the machine tool M.

| B-axis, given Command $\beta$ | 0 | 5 | 10 | 15 |
|---|---|---|---|---|
| B-axis, Calculated $\beta$ | 0.000 | 5.152 | 10.157 | 14.871 |
| B'-axis, Command $\theta$ | 0 | 20 | 40 | 60 |
| C-axis, Calculated $\delta$ | 90.000 | 80.334 | 70.630 | 60.853 |
| C-axis, Command $\delta$ | 0 | 80 | 70 | 60 |

| B-axis, given Command $\beta$ | 20 | 25 | 30 |
|---|---|---|---|
| B-axis, Calculated $\beta$ | 21.091 | 25.905 | 30.000 |
| B'-axis, Command $\theta$ | 90 | 120 | 180 |
| C-axis, Calculated $\delta$ | 45.993 | 30.867 | 0.000 |
| C-axis, Command $\delta$ | 45 | 30 | 0 |

There will be described a positional error correction of the spindle head 9 according to an embodiment of the invention. It should be noted that in this embodiment each rotational axis, e.g. B'-axis or C-axis, is referred to as a direction or vector normal to a plane of the rotation, as necessary.

Figure 3:
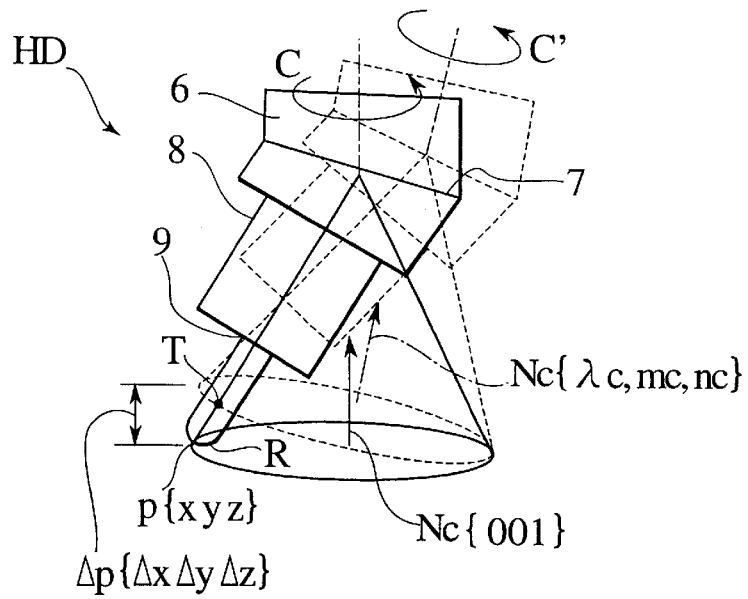
FIG. 3 is an elevation of the angular dividing head actuated with the B'-axis fixed, to rotate theoretically about the C-axis, and actually about a real C (=C')-axis.

As shown in FIG. 3, keeping the B'-axis inclined at an arbitrary angle relative to an actual or real C-axis (i.e. C'-axis), the dividing unit 6 is rotated about the C'-axis together with the spindle unit 8, each time by a predetermined angle, and a positional error that the center of the tool tip then actually has is measured, to have a sequence of measured error data $\Delta p_k\{\Delta x_k, \Delta y_k, \Delta z_k\}$ for k=1 to n, where k is a simple suffix identifying a k-th measurement, and n is an integer.

Then, coordinates of a theoretical rotational position about the C-axis are added to the error data to obtain a sequence of estimated positional data $p_k\{x_k, y_k, z_k\}$ about the C'-axis for k=1 to n.

Then, assuming $x_k$ and $y_k$ to be independent variables and $z_k$ to be a dependent variable, a multi-recurrence analysis is performed to determine a swiveling plane about the C'-axis, by using a recurrence equation (7), such that:

$$z=b_0+b_1x+b_2y \quad (7).$$

Then, calculating $s=\sqrt{1+b_1^2+b_2^2}$, $l_c=-b_1/s$, $m_c=-b_2/s$, $n_c=1/s$, and $d=-b_0/s$, the swiveling plane is expressed by an equation (8), such that:

$$l_cx+m_cy+n_cz+d=0 \quad (8).$$

This swiveling plane has a normal vector $N_c\{l_c,m_c,n_c\}$, which is assumed to be a vector in a direction of the C'-axis. This vector is defined in the absolute coordinate system, involving a theoretical position representative vector which represents the theoretical rotational position about the C-axis and an error representative vector which represents an actual positional error at a respective divided angular position, with the B'-axis fixed.

Figure 4:
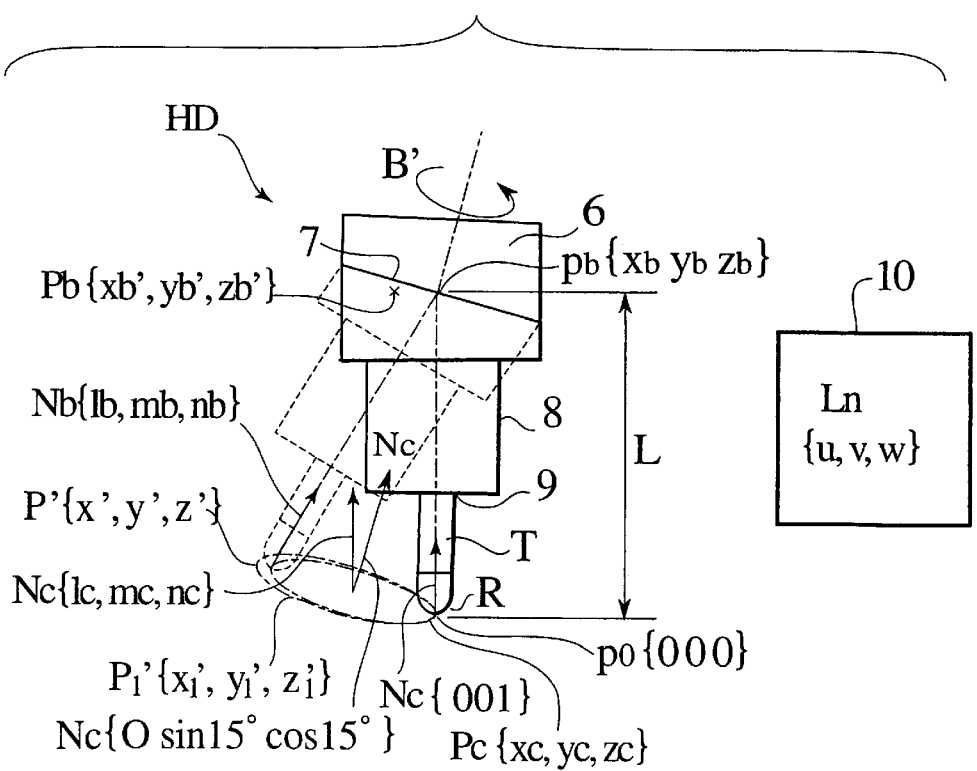
FIG. 4 is an elevation of the angular dividing head actuated with the C-axis fixed, to rotate about the B'-axis.

Next, as shown in FIG. 4, keeping the C-axis fixed to φ=0, the spindle unit 8 is rotated about an acutual B'-axis, each time by a predetermined angle, and a positional error of the center of the tool tip is measured, to have a sequence of measured error data, which is based on to likewise determine a normal vector $N_b\{l_b, m_b, n_b\}$ of a rotational plane of this B'axis.

For the angular position φ=0 and γ=0, coordinates $\{x_0, y_0, z_0\}$ of the center of the tool tip and a directional vector $\{i_0, j_0, k_0\}$ of the spindle head 9 are expressed in the form of a 2-row by 3-column matrix, such that:

$$\begin{Bmatrix} x_0 & y_0 & z_0 \\ i_0 & j_0 & k_0 \end{Bmatrix} = \begin{Bmatrix} 0 & 0 & 0 \\ 0 & 0 & 1 \end{Bmatrix}. \quad (9)$$

As the position of the tool tip center is the origin $p_0\{0, 0, 0\}$, the B'-axis has a center $P_b'\{x_b', y_b', z_b'\}$ of its rotation, such that $x_b'=L \cdot l_c$, $y_b'=L \cdot m_c$, and $z_b'=L \cdot n_c$.

When the position and direction of the tool tip center are rotated θ degrees about the center $P_b'\{x_b', y_b', z_b'\}$ of rotation and the normal vector $N_b\{l_b, m_b, n_b\}$, respectively, they are collectively expressed by matrices, such that:

$$\begin{Bmatrix} x_1' & y_1' & z_1' \\ i_1' & j_1' & k_1' \end{Bmatrix} = \begin{Bmatrix} x_0 - x_b' & y_0 - y_b' & z_0 - z_b' \\ i_0 & j_0 & k_0 \end{Bmatrix}[R_\theta] + \begin{Bmatrix} x_b' & y_b' & z_b' \\ 0 & 0 & 0 \end{Bmatrix}, \quad (10)$$

where $[R_\theta]$ is a rotation converting matrix, such that:

$$[R_\theta] = \begin{bmatrix} l_b^2 + (1-l_b^2)\cos\theta & l_b \cdot m_b(1-\cos\theta) + n_b\sin\theta & l_b \cdot n_b(1-\cos\theta) - m_b\sin\theta \\ l_b \cdot m_b(1-\cos\theta) - n_b\sin\theta & m_b^2 + (1-m_b^2)\cos\theta & m_b \cdot n_b(1-\cos\theta) + l_b\sin\theta \\ l_b \cdot n_b(1-\cos\theta) + m_b\sin\theta & m_b \cdot n_b(1-\cos\theta) - l_b\sin\theta & n_b^2 + (1-n_b^2)\cos\theta \end{bmatrix}. \quad (11)$$

As the position and the direction are likewise rotated φ degrees about a center $p_c\{x_c, y_c, z_c\}$ of rotation and a sirectional vector $N_c\{l_c, m_c, n_c\}$, they are again expressed by matrices, such that:

$$p'\begin{Bmatrix} x' & y' & z' \\ i' & j' & k' \end{Bmatrix} = \begin{Bmatrix} x_1' - x_c & y_1' - y_c & z_1' - z_c \\ i_1' & j_1' & k_1' \end{Bmatrix}[R_\varphi] + \begin{Bmatrix} x_c & y_c & z_c \\ 0 & 0 & 0 \end{Bmatrix}, \quad (12)$$

where $[R_\varphi]$ is a rotation converting matrix, such that:

$$[R_\varphi] = \begin{bmatrix} l_c^2 + (1-l_c^2)\cos\varphi & l_c \cdot m_c(1-\cos\varphi) + n_c\sin\varphi & l_c \cdot n_c(1-\cos\varphi) - m_c\sin\varphi \\ l_c \cdot m_c(1-\cos\varphi) - n_c\sin\varphi & m_c^2 + (1-m_c^2)\cos\varphi & m_c \cdot n_c(1-\cos\varphi) + l_c\sin\varphi \\ l_c \cdot n_c(1-\cos\varphi) + m_c\sin\varphi & m_c \cdot n_c(1-\cos\varphi) - l_c\sin\varphi & n_c^2 + (1-n_c^2)\cos\varphi \end{bmatrix}. \quad (13)$$

By the foregoing rotation conversoin operations, there are given a position and a direction of the tool tip center when the B'-axis and the C'-axis are rotated θ and φ degrees. A resultant division vector is defined in the absolute coordinate system, involving a theoretical position representative vector which represents a theoretical angular position of the tool tip center and an error representative vector which represents an actual positional error at a respective divided angular position.

On the other hand, letting $L_N$ be a nominal dimension between a rotation center of a B-axis and a tool tip center, to be used by a host processor when preparing an NC command program, coordinate offset values $\{u, v, w\}$ for the NC command can be expressed, such that:

$$u = -L_N \sin\beta \cos\gamma, \ v = -L_N \sin\beta \sin\gamma, \ w = -L_N \cos\beta + L_N \quad (14).$$

Predictable errors are differences between the coordinates $\{x', y', z'\}$ and $\{u, v, w\}$, such that $\{x'-u, y'-v, z'-w\}$, of which elements as errors may have their signs inverted to be employed as correction values for NC program coordinates to be thereby offset for positional error correction.

If positional errors remain still after the foregoing compensation, there may well be performed a multi-recurrence analysis having sin B', cosB', sinC', and cos C' and their products as independent variables, and Δx, Δy, and Δz as dependent variables, to thereby determine an error function. A recurrence analysis of the error function may allow calculation of the errors Δx, Δy, and Δz for a respective angular position, which may be added to the converted rotation errors to permit a correction with a reduced error.

The above calculation of values for spindle head positional error correction, may well be performed every spindle head dividing command by executing a sub-macro of the calculation in the spindle head dividing command.

Next, with reference to a flowchart of FIG. 7, there will be described a process of correcting commands for spindle head positions to be deducted by dividing.

First, it is checked whether the deduced position of C-axis (C-axis swivel position) at that time is the original point (step S10). Unless, the position is deduced to the original point (step S11).

Then the deduction to B-axis command position (step S12) is performed, followed by the deduction to C-axis command position (step S13).

The sub-macro for calculation of correction amount is executed to obtain correction amount (step S14). The current correction amount is subtracted from the new correction amount to determine final correction amount (step S15).

The final correction amount is added to the current program coordinate to set a new program coordination system (step S16). The new correction amount is stored as a macro variant (step S17).

It is also possible to record distance Lg from the spindle swivel center to the tool gage line inherent to the machine tool, and record distance Lt from the tool gage line to the radial center of the cutting edge of the tool in a tool data table of an automatic tool changing apparatus, and refer to the distance data at the time of changing the tool to perform swivel correction calculation of the tool.

According to the embodiment, there is provided a method for correcting error in spindle head position of a multi-axis machine tool, the machine tool comprising a first member arranged to be rotatable 360 degrees about a vertical axis thereof, and a second member arranged to be opposed to the first member at their swiveling surfaces inclined relative to a swivel axis line of the first member, the second member being rotatable about an inclined axis line extending in the direction to pass through the inclined swiveling surfaces at a right. angle, the spindle head being mounted on the second member, the method comprising the steps of measuring a spindle end position at every prescribed swivel angle when the first member swivels about the vertical axis while the swivel angle of the second member about the inclined axis line is fixed at a prescribed angle, determining an axial vector of the first member from the measured values, measuring the spindle end position at every prescribed swivel angle when the second member swivels around the inclined axis line while the swivel angle about the vertical axis line of the first member is fixed at a prescribed angle, determining an axial vector of the second member from the measured values, positioning the axis end which swivel around the axis lines of the axial vectors, and correcting spindle head position error with a difference between the position of the spindle end and the precise position of the spindle as a spindle head position error. Therefore, positional error of the spindle head caused by error related to C-axis and B'-axis can be corrected, and the correction can be automated.

The method further comprises offsetting a NC program coordinate with a value of the reversed spindle head position error as a correction value, to correct the spindle head position error. Therefore, positional error of the spindle head caused by error related to C-axis and B'-axis can be corrected with no need for high-speed calculation for correcting position in the machining process.

The method further comprises performing multiple regression analysis of the measured value of the spindle end position from regression equation to determine a swivel plane, a normal vector of the swivel plane being as the axis direction vector. Therefore, positional error of the spindle head caused by error related to C-axis and B'-axis can be corrected by such a stable method, and the correction can be automated.

The method further comprises the steps of recording a distance from a spindle swiveling center to a tool gage line inherent to the machine tool, recording a distance from the tool gage line to the radial center of the cutting edge of the tool, and referring the distance data to perform swivel correction calculation of the tool at the time of changing the tool. Therefore, the correction calculation is automatically performed when the tool is changed, which allows unattended automatic operation of the machine tool.

While preferred embodiments of the present invention have been described using specific terms, such description is for illustrative purposes, and it is to be understood that changes and variations may be made without departing from the spirit or scope of the following claims.

What is claimed is:

1. A spindle head positional error correction method for a multi-axis machine tool including an angular dividing head having a spindle head mounted thereto, the method comprising the steps of:
    determining an error representative vector componentwise representative of a plurality of positional errors with respect to a plurality of axes of the spindle head at a respective angular position dividable by the angular dividing head; and
    correcting an arbitrary positional error of the spindle head by calculating a component vector of the error representative vector associated with the respective angular position.

2. A spindle head positional error correction method according to claim 1, wherein the plurality of axes includes a first axis and a second axis different of direction, and the error representative vector comprises one of a first error vector representative of a positional error of the spindle head at the respective angular position with respect to the first axis and a second error vector representative of a positional error of the spindle head at the respective angular position with respect to the second axis.

3. A spindle head positional error correction method according to claim 2, wherein the angular dividing head includes a horizontal curbic coupling having a horizontal swiveling surface and an inclined curbic coupling having an inclined swiveling surface, and the first axis and the second axis are perpendicular to the horizontal swiveling surface and the inclined swiveling surface, respectively.

4. A spindle head positional error correction method according to claim 3, wherein the first error vector and the second error vector are normal to the horizontal swiveling surface and the inclined swiveling surface, respectively.

5. A spindle head positional error correction method according to claim 1, wherein the correcting the arbitrary positional error includes offsetting an NC program coordinate by a reverse vector of the component vector.

6. A spindle head positional error correction method according to claim 1, further comprising the steps of:
    storing a first distance between a swiveling center of the angular dividing head and a tool gauge line of the spindle head for a tool to be fixed thereto and a second distance between a tool gauge line of the tool and a center of a tip of the tool; and
    collating the first and second distances when fixing the tool to the spindle head, to perform the correcting the arbitrary positional error.

* * * * *